United States Patent
Bastani et al.

(10) Patent No.: US 6,490,326 B1
(45) Date of Patent: Dec. 3, 2002

(54) METHOD AND APPARATUS TO CORRECT FOR IN-PHASE AND QUADRATURE-PHASE GAIN IMBALANCE IN COMMUNICATION CIRCUITRY

(75) Inventors: Babak Bastani, Weston, FL (US); Edwin E. Bautista, Hollywood, FL (US); Joseph P. Heck, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/366,757

(22) Filed: Aug. 4, 1999

(51) Int. Cl.[7] .......................... H04L 25/06; H04L 25/10
(52) U.S. Cl. ....................................... 375/317; 375/316
(58) Field of Search .................................. 375/317, 316, 375/261, 324, 328, 329, 349; 455/205, 209, 199.1, 200.1, 232.1, 277.1, 295; 332/123, 159, 160

(56) References Cited

U.S. PATENT DOCUMENTS

| | | | |
|---|---|---|---|
| 4,081,827 A | * 3/1978 | Hipwell | 348/455 |
| 4,122,448 A | 10/1978 | Martin | 343/7.7 |
| 5,396,656 A | 3/1995 | Jasper et al. | 455/295 |
| 6,259,253 B1 | * 7/2001 | Ellingson | 324/322 |
| 6,404,293 B1 | * 6/2002 | Darabi et al. | 331/37 |

* cited by examiner

Primary Examiner—Mohammad H. Ghayour
(74) Attorney, Agent, or Firm—Barbara R. Doutre; Frank M. Scuteh, III

(57) ABSTRACT

Communication apparatus (100) corrects for amplitude imbalance caused by differences in circuitry that process in-phase and quadrature signals. The in-phase and quadrature signals are alternately routed in rapid succession through first and second parallel processing circuits or signal paths (140, 150) to cancel imbalances between the signal paths. Switches (132, 134) are employed at inputs to and outputs from corresponding portions of both signal paths, and these switches (132, 134) are synchronously operated in response to a control signal to interchange signals on the signal paths.

10 Claims, 3 Drawing Sheets

METHOD AND APPARATUS TO CORRECT FOR IN-PHASE AND QUADRATURE-PHASE GAIN IMBALANCE IN COMMUNICATION CIRCUITRY

TECHNICAL FIELD

This invention relates in general to communication devices, and in particular, to communication devices susceptible to gain imbalance caused by mismatches and imperfections in circuitry that process in-phase and quadrature-phase signals.

BACKGROUND OF THE INVENTION

Certain radio frequency (RF) applications perform signal processing operations by separating radio frequency signals into signal components representing in-phase and quadrature channels (I and Q channels). For example, in direct conversion receivers, in-phase and quadrature phase signals are utilized to help in demodulating received signals. Generally, signals on the I and Q channel have equal amplitudes and a ninety degree phase difference, and these signals are separately processed by similar circuitry that maintain the amplitude and phase relationships. However, imperfections and mismatches in implementing circuitry may lead to an amplitude or phase imbalance, i.e., a deviation from the ideal amplitude and phase relationships.

When phase or gain imbalance distorts the received signal, subsequent signal processing is impacted. The prior art has long used higher tolerance components in an attempt to avoid imbalances between the I and Q components. Such an approach has significant cost impact and may still not adequately address the problem. Another prior art approach attempts to account for imbalance by estimating and removing the imbalance. One such approach is described in U.S. Pat. No. 5,396,656 issued on Mar. 7, 1995, to Jasper et al., for a Method For Determining Desired Components Of Quadrature Modulated Signals. Here, a closed loop feedback technique is used to continuously determine an error signal by updating estimates of an imbalance component until the magnitude of the error signal is negligible. Yet another approach is described in U.S. Pat. No. 4,122,448 issued on Oct. 24, 1978, to Martin, for an Automatic Phase And Gain Balance Controller For A Baseband Processor. Martin uses a pilot signal to determine phase and amplitude imbalances, and these imbalances are corrected using a feedback circuit.

It is desired in the art to provide an effective solution to mitigate imbalance caused by imperfections or mismatches in separate circuitry that process I and Q signals. Preferably, such solution is easily adaptable to existing circuit designs and does not have substantial circuitry and/or signal processing requirements.

DETAILED DESCRIPTION OF THE PREFERRED EMBODIMENT

Figure 1:
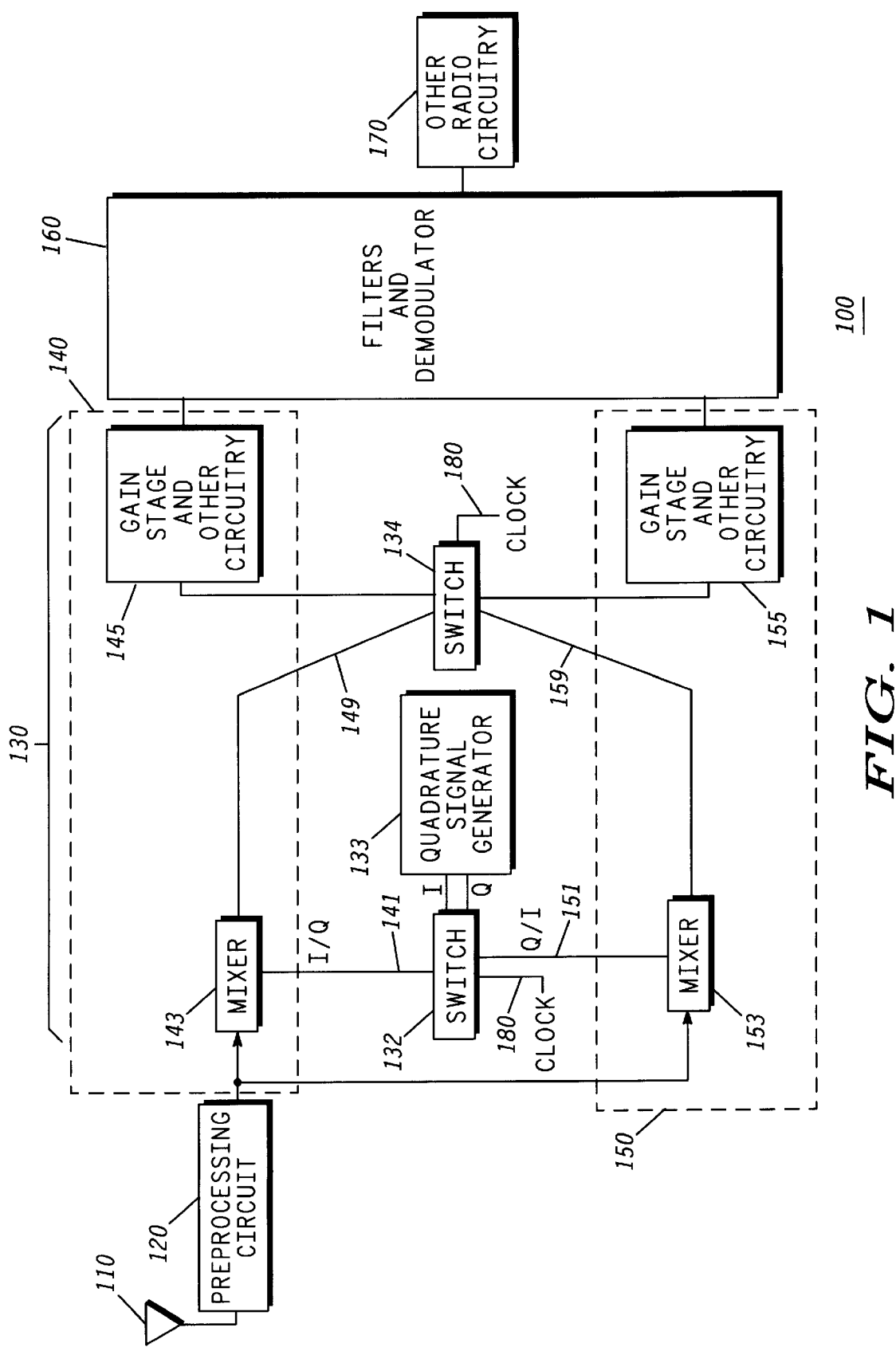
FIG. 1 is a block diagram of radio receiver circuitry that uses a dynamic matching switching apparatus to account for imbalances between mixers in the I and Q paths, in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, the present invention provides a method and apparatus for correcting for amplitude imbalance caused by differences in circuitry that process in-phase and quadrature signals. The in-phase and quadrature signals are individually routed in parallel through first and second processing circuits or signal paths, respectively, then subsequently routed in parallel through the second and first processing circuits, respectively. Routing is alternated repeatedly in rapid succession to average out or cancel imbalances between the signal paths. Preferably, first and second switching apparatus are employed at inputs to and outputs from corresponding portions of circuitry in the first and second paths, and are synchronously switched in response to a control signal to interchange signals on the signal paths.

Referring to FIG. 1, a communication device 100 has radio receiver circuitry that uses a dynamic matching switching arrangement to account for imbalances between mixers in parallel signal processing paths, in accordance with the present invention. In the preferred embodiment, the communication device is a direct conversion receiver that processes a radio frequency signal using in-phase and quadrature signal processing techniques. The radio communication device 100 includes an antenna 110 and preprocessing circuitry 120 for receiving, filtering, and amplifying wireless radio frequency (RF) signals, and a signal processing block 130 and filter and demodulator circuitry 160 for demodulating the received signal. The communication device 100 further includes other radio circuitry 170 (not shown in detail) for generating and processing communication signals. Certain elements of the functional blocks shown may be implemented in software and/or hardware as would be appreciated by those skilled in the art.

The signal processing block 130 has two signal paths or processing circuits 140, 150 for separately processing in-phase and quadrature signals. Ideally, these types of processing circuits are balanced, i.e., the circuits preserve the phase and amplitude relationships of the processed signal. Each of the two signal paths has an input 141, 151 and an output 149, 159, and at least one active circuit element between the input 141, 151 and output 149, 159. In the preferred embodiment, the signal paths include, as active circuit elements, a mixer 143, 153 and a gain stage 145, 155. A quadrature generator 133 functions as a signal source that provides in-phase (I) and quadrature (Q) signals to the mixers 143, 153. The mixers 143, 153 combine the I and Q signals with the RF signals, thereby separating the RF signals into I and Q components to facilitate demodulation.

According to the present invention, the receiver has a switching arrangement that includes a switch or switching apparatus 132 that couples the in-phase and quadrature signals from the quadrature generator 133 to the inputs 141, 151 of the in-phase and quadrature signal paths, represented by the inputs to the mixers 143, 153. Another switch or switching apparatus 134 is coupled to provide outputs from the in-phase and quadrature signal paths, represented by the outputs from the mixers 143, 153. A clock signal is coupled to both switching apparatus 132, 134 and acts as a control signal. The switches 132, 134 are responsive to the control signal 180 to interchange in-phase signals from the quadrature generator 133 with quadrature signals from the quadrature generator, at the inputs to the mixers 143, 153, while synchronously interchanging output signals from both mixers 143, 153.

Figure 2:
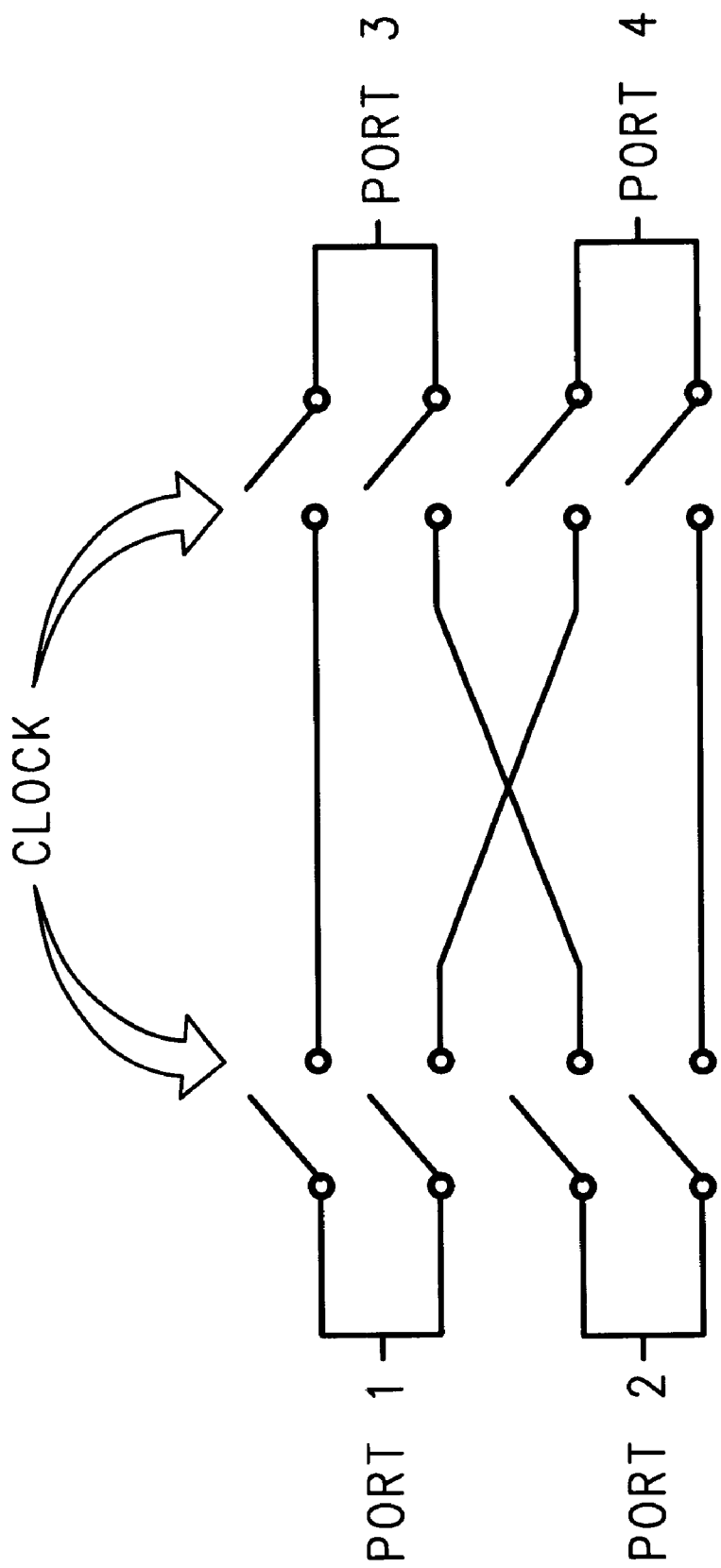
FIG. 2 is a diagram highlighting operation of a dynamic matching switching apparatus, in accordance with the present invention.

The switches 132, 134 synchronously operate in response to the clock signal 180 or other trigger signal to rapidly switch between the alternative or parallel signal paths for in-phase and quadrature-phase signal processing. A more detailed representation of this type of switch is shown in FIG. 2. Here, the switches act in concert to interconnect Port 1 to Port 3 and Port 2 to Port 4, or in the alternative, interconnect Port I to Port 4 and Port 2 to Port 3. The switches 132, 134 are constructed to operate in a similar manner. The clock signal line provides a rapid periodic or pseudo-random signal to trigger the switches.

Figure 3:
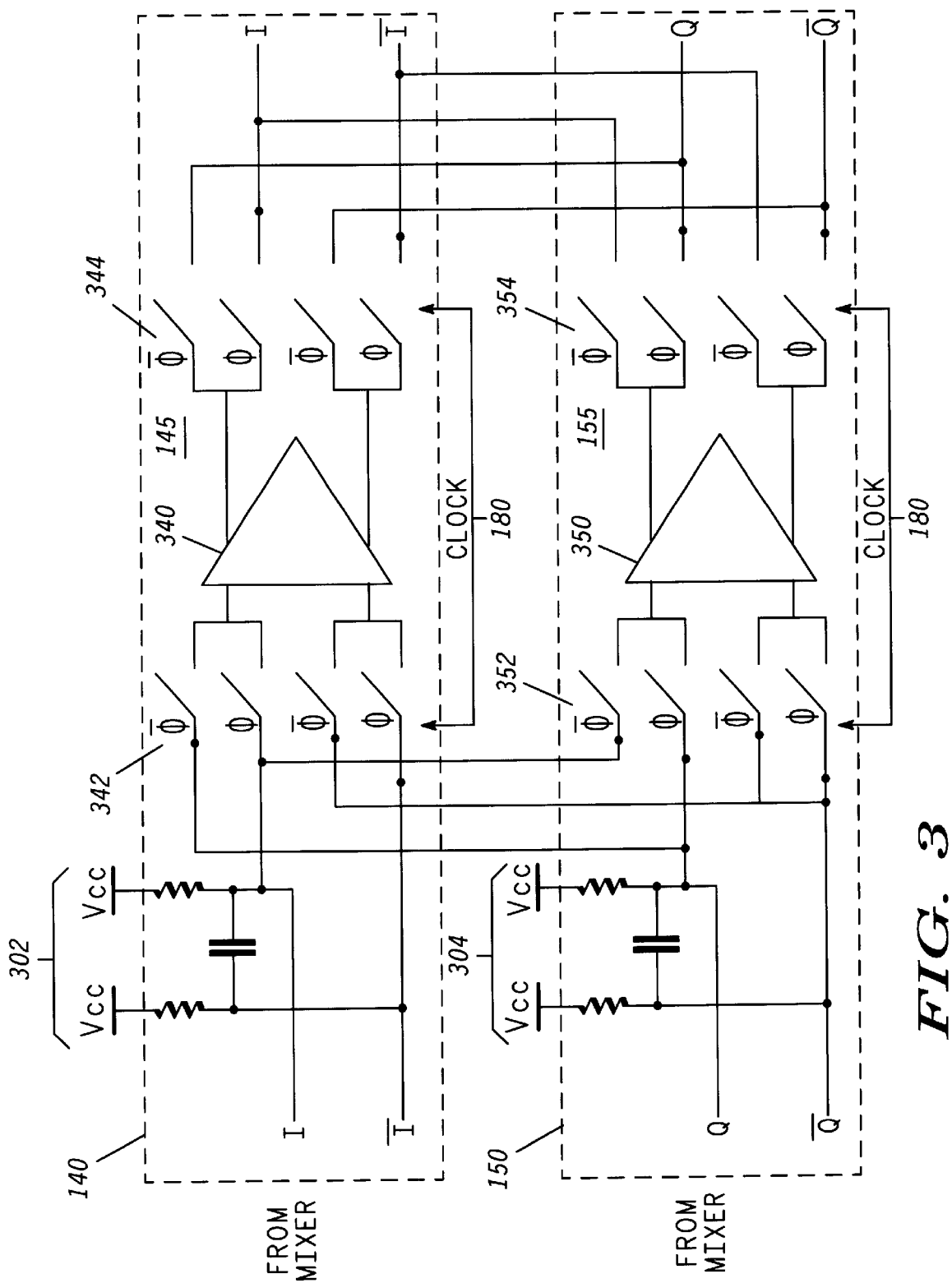
FIG. 3 is a block diagram of radio receiver circuitry that uses a dynamic matching switching apparatus to account for imbalances between amplifiers in the I and Q paths, in accordance with the present invention.

Referring to FIG. 3, the application of dynamic switching to gain stage circuitry of the radio receiver to address baseband gain imbalances in the I and Q paths is shown, in accordance with the present invention. As shown, the radio receiver circuitry is implemented using differential signal lines. The I and Q signal paths 140, 150, both have an amplifier 340, 350 as an active circuit element. In the preferred embodiment, the I and Q signals that are sourced from the mixers (see FIG. 1), are appropriately filtered through resistor capacitor (RC) low pass filter networks 302, 304 to remove switching spurs. The circuitry uses a dynamic matching switching apparatus to account for potential imbalances between the amplifiers 340, 350. The switching apparatus includes a first set of switches 342, 352 positioned at the input of the amplifiers 340, 350 and a second set of switches 344, 354 positioned at the output of the amplifiers. Each switch 342, 352, 344, 354 is coupled to corresponding points on signal lines of both signal paths. Particularly, each of the first set of switches 342, 352 is interposed between points on the I and Q paths prior to or at the input of the amplifiers 340, 350, and each of the second set of switches 344, 354 is interposed between points on the I and Q paths after or at the output of the amplifiers 340, 350. Again, the switches are responsive to a control signal 180 to contemporaneously interchange signals between the in-phase signal path and the quadrature signal path at the respective coupling points, such that the in-phase and quadrature signals are alternately swapped with respect to the amplifiers.

The present invention provides significant benefits over the prior art. Ordinarily, in-phase and quadrature signals are processed through parallel signal paths. By rapidly alternating the processing of these signals through the parallel signal paths, amplitude/gain imbalances caused by imperfections in implementing circuitry are averaged out, thereby providing a more balanced signal that facilitates subsequent signal processing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A communication apparatus, comprising:
 a signal processing circuit having first and second signal paths for separately processing in-phase and quadrature signals, each of the first and second signal paths having an input and an output;
 a signal source that provides in-phase and quadrature signals;
 a first switching apparatus coupling the in-phase and quadrature signals from the signal source to the inputs of the first and second signal paths; and
 a second switching apparatus coupled to the outputs of the first and second signal paths;
 wherein the first switching apparatus and the second switching apparatus are responsive to a control signal to synchronously interchange signals from the signal source to the input of the first signal path with signals from the signal source to the input of the second signal path, and to interchange signals from the output of the first signal path with signals from output of the second signal path.

2. The communication apparatus of claim 1, wherein each of the first and second signal paths comprises at least one active circuit element in between the input and the output.

3. The communication apparatus of claim 2, wherein the at least one active circuit element comprises a mixer.

4. The communication apparatus of claim 2, wherein the at least one active circuit element comprises an amplifier.

5. The communication apparatus of claim 1, further comprising a clock signal line coupled to the first switching apparatus and to the second switching apparatus to provide the control signal.

6. A communication device, comprising:
 a communication circuit having an in-phase signal path and a quadrature signal path, each signal path having first and second points thereon with at least one active circuit element there between;
 a first switching apparatus interposed between the first point on the in-phase signal path and the first point on the quadrature signal path;
 a second switching apparatus interposed between the second point on the in-phase signal path and the second point on the quadrature signal path;
 wherein the first switching apparatus and the second switching apparatus are responsive to a control signal to contemporaneously:
  interchange signals between the in-phase signal path and the quadrature signal path at the respective first points; and
  interchange signals between the in-phase signal path and the quadrature signal path at the respective second points.

7. The communication device of claim 6, wherein the at least one active circuit element of each of the in-phase and quadrature signal paths comprises a mixer.

8. The communication device of claim 6, wherein the at least one active circuit element of each of the in-phase and quadrature signal paths comprises an amplifier.

9. The communication device of claim 6, further comprising a signal source coupled through the first switching apparatus to the first points of the in-phase and quadrature signal paths.

10. The communication device of claim 6, further comprising a clock signal line coupled to the first switching apparatus and to the second switching apparatus to provide the control signal.

* * * * *